United States Patent
Arana Hidalgo et al.

(10) Patent No.: US 12,103,252 B2
(45) Date of Patent: Oct. 1, 2024

(54) DEVICE AND METHOD FOR MANUFACTURING COMPOSITE PARTS FOR AN AIRCRAFT BULKHEAD

(71) Applicant: AIRBUS OPERATIONS SL, Madrid (ES)

(72) Inventors: Alberto Arana Hidalgo, Madrid (ES); Pedro Nogueroles Vines, Madrid (ES)

(73) Assignee: AIRBUS OPERATIONS SL, Madrid (ES)

( * ) Notice: Subject to any disclaimer, the term of this patent is extended or adjusted under 35 U.S.C. 154(b) by 2 days.

(21) Appl. No.: 17/742,263

(22) Filed: May 11, 2022

(65) Prior Publication Data

US 2023/0364867 A1 Nov. 16, 2023

(51) Int. Cl.
*B29C 70/54* (2006.01)
*B29C 70/46* (2006.01)
*B29L 31/30* (2006.01)

(52) U.S. Cl.
CPC .......... *B29C 70/541* (2013.01); *B29C 70/462* (2013.01); *B29L 2031/3082* (2013.01)

(58) Field of Classification Search
CPC ..... B29C 70/541; B29C 70/462; B29C 70/38; B29C 70/32; B29C 70/30; B29L 2031/3082
See application file for complete search history.

(56) References Cited

U.S. PATENT DOCUMENTS 5,062,589 A 11/1991 Roth et al.
9,375,907 B2 * 6/2016 Boge ...................... B25J 9/0084
2005/0161861 A1 * 7/2005 Lammers ................. B29B 11/16
  425/375
2010/0006202 A1 * 1/2010 Schendel ............... B29C 70/386
  156/60
2014/0342028 A1 * 11/2014 Kwon ..................... B29C 70/32
  425/367
2015/0360423 A1 12/2015 Torres Martinez
2020/0324459 A1 * 10/2020 Barnes .................... B29C 64/20

FOREIGN PATENT DOCUMENTS

| DE | 195 03 939 | | 6/1996 | |
|---|---|---|---|---|
| DE | 10 2010 039 955 | | 3/2012 | |
| EP | 0 783 959 | | 7/1997 | |
| KR | 20190088104 | * | 7/2019 | ........... B29C 64/227 |

OTHER PUBLICATIONS

European Search Report cited in EP 21382323.0 mailed Sep. 28, 2021, 9 pages.

* cited by examiner

*Primary Examiner* — Christopher M Rodd
*Assistant Examiner* — Shibin Liang
(74) *Attorney, Agent, or Firm* — Nixon & Vanderhye P.C.

(57) ABSTRACT

A device (40) and a method for manufacturing composite parts such as aircraft bulkheads (23), in which a component of the composite part is placed on a first mold (11) with a robotic device (21), a component of another composite part is placed on a second mold (12) with a robotic device (22), the second mold (12) having a surface identical to the surface the first mold (11), and the first mold and the second mold being mounted on a frame in a central symmetric arrangement around a symmetry central point (15), such that components are placed on the molds (11, 12) symmetrically so as to obtain two identical composite parts at the same time.

23 Claims, 5 Drawing Sheets

DEVICE AND METHOD FOR MANUFACTURING COMPOSITE PARTS FOR AN AIRCRAFT BULKHEAD

FIELD

The invention relates to a device and method to manufacture a composite parts for a bulkhead.

BACKGROUND

The bulkhead is large on a commercial aircraft. The bulkhead separates a pressurized section, such as a passenger or cargo compartment, of a fuselage of the aircraft from an unpressurized section of the fuselage. The bulkhead is subject to high loads (forces) because it separates the pressurized section from an unpressurized section.

The attachments that secure the bulkhead to the frame of a fuselage transfer the forces acting on the bulkhead to the frame. To safely and reliably transfer the forces, the attachments are typically bulky and require a much labor to create. U.S. Pat. No. 5,062,589 discloses a one-piece composite aircraft bulkhead that is adapted to merge with the geometry of the fuselage of the aircraft.

SUMMARY

The costs to manufacture bulkheads is partially dependent on the floor space needed for the machinery and human operators that make the bulkhead. Reducing the floor space needed to manufacture a bulkhead should reduce the cost to make the bulkhead. Another approach to reducing the cost to make bulkheads is for a manufacturing tool, e.g., a robot, to be reused to make multiple parts of the bulkhead and/or attachments to secure the bulkhead to a fuselage frame.

The invention may be embodied to reduce the cost to make aircraft bulkheads by reducing the floor space needed to make bulkheads and by using robots and other manufacturing tools to perform multiple steps in the formation of the bulkheads. The invention may be embodied as a method and device that allow the manufacturing of complex composite parts, such as aircraft bulkheads, an efficient manner.

The invention may be embodied as a device for manufacturing a composite part, e.g., an aircraft bulkhead, the method comprising:
1) a first mold mounted on a frame, said first mold comprising a first functional surface adapted to receive components of a first composite part,
2) a first robotic device adapted to place at least a first component of the first composite part on the first mold,
3) a second mold mounted on the same frame as the first mold, comprising a second functional surface adapted to receive components of a second composite part, the second functional surface of the second mold being identical to the first functional surface of the first mold, and arranged in a central symmetric position around a symmetry central point with regard to the first mold, and
4) a second robotic device adapted to place at least a second component of the second composite part on the second mold.

The term 'functional surface' is used to designate a portion of a surface of a mold to be place components of a composite part to be manufactured on the mold.

The whole surface of the mold need not be used to form a part. Some portions of the mold may be dedicated to others functions such as for example attaching the mold to the frame.

The first mold and the second mold are arranged in a central symmetric position around a symmetry central point. The first mold and the second mold are mounted such that their respective functional surfaces are arranged in a central symmetric position around a symmetry central point.

A device according to the invention allows to manufacture two composite parts at the same time in a simple, effective and compact manner. Thereby the costs of manufacturing such parts may be reduced.

The frame may be adapted to at least rotate the first mold and the second mold simultaneously and around at least one axis.

The frame may be adapted to maintain the first mold and the second mold in their central symmetric relation at any moment. The relative position of the first mold and the second mold is thus maintained such that operations for forming composite parts on the molds may continue to be carried on in parallel.

The frame may be adapted to rotate the first mold and the second mold simultaneously around multiple axes.

The frame may include an engine(s) adapted to provide driving force to pivot the first mold and the second mold, as well as mechanical joints such as pivots or ball joints.

The rotation of the first mold and the second mold may provide access to some portions of their functional surfaces to an operator or to a robotic device for example for placing additional components or for inspecting the molds or the composite parts. The rotation of the first mold and the second mold may also provide for a fast and effective way to add and assemble components so as to form composite parts; for example when the robotic devices pick up a new component to be added to the composite parts, the molds may rotate meanwhile to be in the best position for the robotic devices once they approach the mold with the new component.

The dimension of the frame may be reduced because the weight of the first mold on a first side of the frame and pivoting in a first direction will compensate the weight of the second mold on a second opposite side of the frame. Similarly, the engines, e.g., electrical motors or pneumatic actuators, needed to move the first and second molds may be relatively small powered engines because the movement of the first mold counter-balances the movement of the second mold.

The frame may also be adapted to translate, e.g., move, the molds along one or more directions. The molds may thus be displaced from a first assembly station to a second assembly station, such that an assembly line manufacturing model may be implemented.

The molds may be disassembled from the frame so that they may be handled separately in the production line.

The first robotic device and the second robotic device may be adapted to perform the same operations simultaneously with a central symmetry relationship around the symmetry central point. The first robotic device and the second robotic device are adapted to perform operations in a centro-symmetrical coordinated manner. Such a device thereby allows to manufacture two composite parts simultaneously on one same frame. The programming of such robotic devices is contemplated to be rather simple with the mirroring of the actions of the first robotic device on the second robotic device around the symmetry central point.

A device according to the invention is adapted to place a second component on the second mold identical to a first component placed on the first mold. In some embodiments, the first robotic device and the second robotic device may be identical. Thereby two identical parts may be obtained simultaneously.

The first robotic device and the second robotic device may be adapted to move in relation to the frame.

The frame may displace the first mold and the second mold in relation to the first robotic device and the second robotic device, but the first robotic device and the second robotic device may also move in relation to the frame and thus in relation to the first mold and the second mold. In some embodiments, both the frame and the robotic devices may be mobile, so as to ensure a quick and efficient assembly of the composite parts. Having both a mobile frame and mobile robotic devices allow for the placement of composite components in every area of the functional surfaces of the molds, even when such functional areas are complex.

The first robotic device and the second robotic device may each comprise a composite tape laying device. Laying composite tape is a manufacturing method whereby the components placed on the molds are tapes of a composite material. In the present description, the tape laying method will be considered to also include the so-called "patch placement" method. The complete composite part is made of multiple tapes. The tapes may be pieces of fibers impregnated with a resin. After the tapes are laid using the tape laying device, the whole composite part, including the laid tapes, are cured to form a cured composite part.

The first robotic device and the second robotic device may each comprise a robotic arm.

A robotic arm provides benefits in the present invention as it is a flexible robotic device which may easily be reprogrammed for different molds shapes, and which can achieve complex movements to pick up components from multiple places and place them at different locations on the mold's functional surface.

The robotic arm may comprise one or more interchangeable tools. In particular a composite tape laying device may be mounted on the robotic arm.

The first robotic device and the second robotic device may be adapted to seize and place a rigid component on one of the molds. Thereby the composite part manufactured with a device according to the invention may be made of multiple components of different nature. More particularly the invention allows for the forming of a complex composite part comprising reinforcing components embedded in a composite, such as CFRP (carbon-reinforced polymer), for example. The composite part may be pre-formed parts placed in the molds, for example of the same or similar material as the reinforcements, or pre-cured composite parts adapting to the layered-up material, such as layered up tapes.

The first mold and the second mold may have a convex functional surface.

The functional surface of each mold may be beneficially oriented outward to allow for an easy placement of composite parts on the molds.

In some embodiments, for which the invention has been identified to be particularly beneficial, the first mold and the second mold are adapted to form composite bulkheads of an aircraft.

The first mold and the second mold may be adapted to form a bulkhead for an aircraft's fuselage.

Moreover, a device embodying the invention may have one or more of the following features:

1) The functional surface of the first mold may have a circumferential portion with a curvature radius smaller than a curvature radius of a central portion.
2) The frame and the first robotic device may be adapted to lay composite tapes circumferentially on the circumferential portion of the first mold.
3) The functional surface of the second mold may have a circumferential portion with a curvature radius smaller than a curvature radius than in a central portion.
4) The frame and the second robotic device may be adapted to lay composite tapes around the circumferentially on the circumferential portion of the second mold, and
5) The robotic device and the frame may be adapted to lay composite tapes radially and/or circumferentially and/or any combination of circumferential and radial direction on a mold with a generally revolution symmetrical shape. In this particular case, it is highlighted that a device according to the invention allows to lay tapes circumferentially to a revolution symmetry axis of the mold, that is to say "around" said symmetry axis. Such a property of the device allows to properly reinforce the outer rim of a one-piece bulkhead which has a small curvature radius (high curvature) to be attached to a fuselage with as few intermediate parts as possible.

The first robotic device and the second robotic device may be adapted to lay composite tapes having a width comprised between 0.7 and 7 centimeters. More particularly, the first robotic device and the second robotic device are adapted to lay composite tapes having a width comprised between 1.5 and 5 centimeters. Such width of the composite tapes (or tow) allow to manufacture composite parts with a small curvature radius. In particular, it allows to place composite tapes in the circumferential portion of the molds.

The first robotic device and the second robotic device may be adapted to lay composite tapes respectively on the first mold and second mold, then at least one reinforcing component of a different nature than the composite tapes respectively on the first mold and second mold, and then composite tapes at least partially over said at least one reinforcing component respectively on the first mold and second mold.

The first robotic device and second robotic device are in particular adapted to switch from a tape laying device to another tool type to lay the reinforcing component. The reinforcing component may thus be embedded between two composite laminate, so as to form an integral composite part in one-piece.

The reinforcing component may be of a different nature than the composite. In particular it may be made of a rigid or semi-rigid plastic or metallic alloy.

A device according to the invention allows to place an inner layer of composite tapes circumferentially around a mold, then multiple discrete reinforcing components around the mold circumference, and then an outer layer of composite tapes, at least partially over the reinforcing components.

A device and method according to the invention allows to manufacture a one-piece bulkhead for an aircraft fuselage. Fabricating the bulkhead directly on a mold with automated placement of components allows to manufacture not only the central portion with a high curvature radius of convexity (so that the bulkhead is as flat as possible) of the bulkhead, but also the flanges of the bulkhead which have a small curvature radius to join the bulkhead to the fuselage. Rotating the mold and/or the robotic device allow to place components of the composite bulkhead all around the functional surface so as to obtain the one-piece bulkhead. Such bulkhead, in one piece, is relatively quick to manufacture with a method of the invention.

A one-piece composite bulkhead instead of a bulkhead resulting from the assembly of multiple parts such as gussets, ring frame, bulkhead central portion, etc. aids in reducing the time needed to manufacture the bulkhead. Moreover, fabricating two symmetrically identical composite bulkhead simultaneously on a same frame aids in due to the fact that a device according to the invention limits the manufacturing price of such composite bulkhead.

The invention also extends to a method for the manufacturing of composite parts comprising: placing a first component of a first composite part on a first mold with a first robotic device, and placing a second component of a second composite part on a second mold with a second robotic device wherein said second mold having a functional surface identical to a functional surface of the first mold, and said first mold and second mold both being mounted on a same frame in a central symmetric arrangement around a symmetry central point, and symmetrically to the application of the first component on the first mold, around the symmetry central point.

The molds and the first robotic device and second robotic device may be moving simultaneously and/or in a sequential manner.

In a device and method according to an embodiment(s) of the invention, the components placed on the molds may be tacky. Thereby their application on the molds is facilitated as they may not move from the position at which they have been placed on the molds during subsequent step such as the placement of further components. The tackiness of the component may be: inherent to the component, for example a pre-impregnated CFRP component is tacky, and/or obtained by applying some sort of adhesive to the component or to the mold's functional surface before placing the component.

In some instances, not every component needs to be tacky. If one or more tacky components, such as the above example of a pre-impregnated CFRP component, have been previously placed on the mold, following components need not be tacky because the surface formed by the previous components and on which the following components will be placed is already tacky.

A first component placed by the first robotic device on the first mold and a second component placed by the second robotic device simultaneously on the second mold may be identical.

In particular a first component and a second component, respectively placed by the first robotic device on the first mold and simultaneously by the second robotic device to the second mold, are identical. Thereby two composite parts may be manufactured simultaneously, identical, and in a coordinated manner.

The second robotic device may be programmed so as to mirror the actions of the first robotic device around the symmetry central point, so as to place the second component on the second mold in a central symmetrical arrangement around the symmetry central point to the application of the first component by the first robotic device on the first mold.

Alternatively, the second robotic device may be arranged in a central symmetry to the first robotic device around said symmetry central point, such that each robotic device may be controlled by the same program. For example, if the first robotic device were installed on the ground, the second robotic device may be installed upside down on a ceiling.

In other embodiments of the invention, the first robotic device and the second robotic device may each be placing a specific type of component of the composite part. The first robotic device may therefore place one or more component of a first type on the first mold, while the second robotic device applies one or more component of a second type of the second mold. The molds are then rotated such that the first robotic device may therefore place one or more component of a first type on the second mold and/or the second robotic device may place one or more component of a second type of the second mold.

A method of the invention may be a method for manufacturing an integral bulkhead for an aircraft's fuselage.

The inventors have determined that such method is particularly beneficial to manufacture a composite aircraft bulkhead, in particular an integral bulkhead that is a bulkhead in one-piece which requires fewer intermediate parts to be attached to a fuselage. The composite bulkhead may be manufactured with a method of the invention, as it has a generally convex shape particularly adapted for mounting two molds a in a central symmetry relationship around a pivot or other joint types.

The invention therefore also extends to an aircraft bulkhead obtained by a method of the invention.

The invention also extends to other possible combinations of features described in the above description and in the following description relative to the figures. In particular, the invention extends to methods for manufacturing composite parts and aircraft bulkheads comprising features described in relation to the device for manufacturing composite parts; the invention extends to devices for manufacturing composite parts comprising features described in relation to the method for manufacturing composite parts; and the invention extends to aircraft bulkheads comprising features described in relation to the device for manufacturing composite parts and to the method for manufacturing composite parts.

SUMMARY OF DRAWINGS

Some specific exemplary embodiments and aspects of the invention are described in the following description in reference to the accompanying figures.

DETAILED DESCRIPTION

Figure 1:
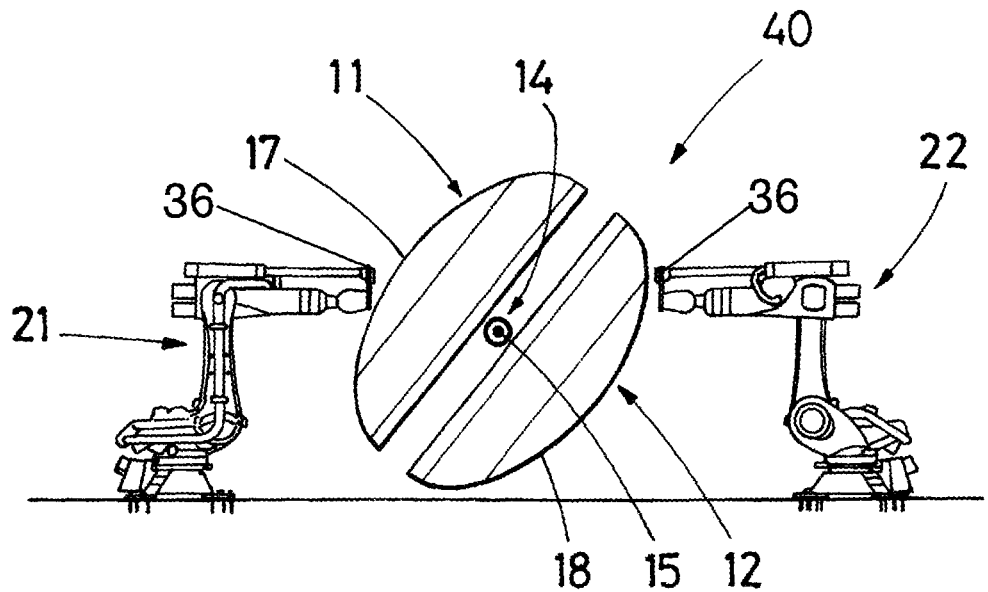
FIG. 1 is a schematic representation of a lateral view of an embodiment of a device for manufacturing composite parts according to the invention.
Figure 2:
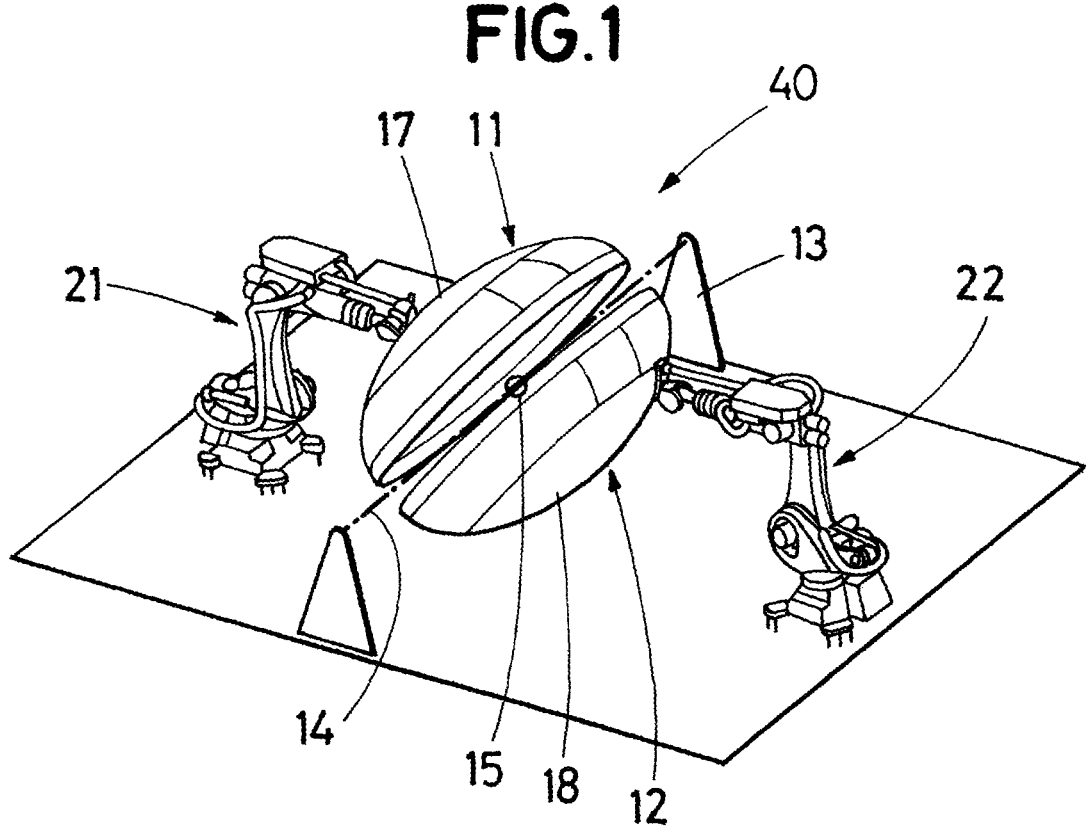
FIG. 2 is a schematic representation of a perspective view of the device represented in FIG. 1.

In FIGS. 1 and 2, an embodiment of a device 40 according to the invention is represented. It comprises a first mold 11 and a second mold 12. The first mold 11 and the second mold 12 are mounted on a pivot of a frame 13. The pivot has an axis 14 passing between the first mold 11 and the second mold 12. The first mold 11 and the second mold 12 are identical in shape. More particularly the functional surface 17 of the first mold 11 is identical to the function surface of the second mold 12. In the embodiment shown on FIGS. 1 and 2, the functional surface 17, 18 of the first mold 11 and the second mold 12 correspond to the external, convex surface of the first mold 11 and the second mold 12. The first mold 11 and the second mold 12 are placed in a central symmetry relationship around a central point 15.

In this embodiment, the first mold 11 and the second mold 12 are each adapted to form a respective bulkhead of an aircraft. The bulkhead may separate a rear fuselage of a commercial aircraft from a fuselage section for receiving cargo and/or passengers.

Moreover, the device comprises a first robotic device 21 and a second robotic device 22.

The first robotic device 21 and the second robotic device 22 are fixed at one extremity to a same referential as the frame 13. In the present embodiment, the referential may be a solid ground. The first robotic device 21 is placed on the side of the first mold 11 with respect to the pivot axis 14. The second robotic device 22 is placed on the side of the second mold 12 with respect to the pivot axis 14. More particularly the first robotic device 21 and the second robotic device 22 are placed such that they may place composite elements respectively on the functional surface 17 of the first mold 11 and on the functional surface 18 of the second mold 12.

Also the pivot 14 may allow rotation of the first mold 11 and the second mold 12. This rotation may allow the first mold 11 to move from a position adjacent the first robotic device to a position adjacent the second robotic device 22 to allow the second robotic device to place components on the functional surface 17 of the first mold. Similarly and simultaneous to the turning of the first mold, the second mold 12 may turn about the pivot 14 from a position adjacent the second robotic to a position adjacent the first robotic device 21 to place components on its functional surface 18; that is the position of the first mold and the second mold are inverted with respect to a plane passing between the molds.

In this embodiment, the first robotic device 21 and the second robotic device 22 are industrial robotic arms such 6-axis articulated robotic arms. Each of the first robotic device 21 and the second robotic device 22 are equipped with a composite tape laying device 36 as a tool at their functional extremity. Each of the first robotic device 21 and the second robotic device 22 are thus adapted to lay composite tapes on the first mold 11 and the second mold 12.

The first robotic device 21 and the second robotic device 22 are programmed so as to place composite elements—such as composite tapes for example—on the first mold 11 and the second mold 12 simultaneously. More particularly, the first robotic device 21 and the second robotic device 22 are programmed and controlled to place identical composite components simultaneously, respectively on the first mold 11 and the second mold 12, at symmetrical positions on said molds 11, 12 with respect to the symmetry central point 15.

The first and second molds and first and second robotic devices allow for the manufacture two identical aircraft bulkheads simultaneously in a very efficient and replicable manner.

In an alternative embodiment of the invention, the first mold 11 and the second mold 12 may be mounted pivoting on the frame 13 around an axis different from the pivot axis 14 of FIG. 1 and FIG. 2. The first mold 11 and the second mold 12 may be mounted pivoting around an axis parallel or collinear to a rotational symmetry axis 35 of the first mold 11 and the second mold 12. This pivoting axis would be orthogonal to a plane passing between the first mold 11 and the second mold 12. Any section of the first mold 11 and the second mold 12 may thus be presented at a low point, a high point or a lateral point of the assembly by a simple rotation around such pivoting axis. This also allows to place, manually or by a robotic device, a continuous tape around a circumference of a mold 11, 12, or in a helical manner on the mold 11, 12.

Figure 3:
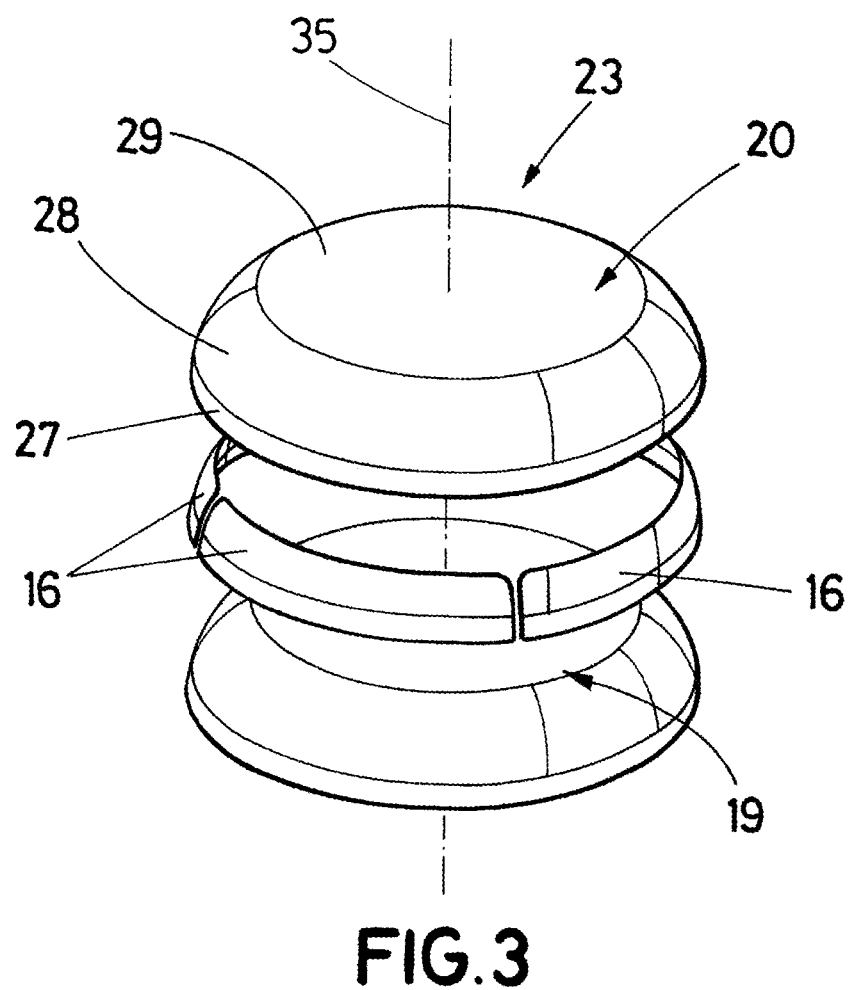
FIG. 3 is a schematic exploded view of a bulkhead for an aircraft that may be manufactured with a device and/or method of the invention.

In FIG. 3, an exploded view of an exemplary embodiment of an aircraft bulkhead 23 that can be manufactured with a device and a method according to the invention is schematically represented. The bulkhead 23 comprises an inner first composite layer 19, reinforcing components 16, and an outer second composite layer 20. The first composite layer 19 and the second composite layer 20 are laminates made of composite material, such as CFRP for example. They are obtained by successive application of multiple composite tapes applied by the first robotic device and/or the second robotic device.

A first step of a method according to the invention, the first robotic device and second robotic device may place composite components, e.g., composite tapes, on the first mold and the second mold (the molds being not represented) to form at least the first composite layer 19.

In a second step, the first robotic device 21 and the second robotic device 22 and/or one or more operators may place one or more reinforcing components 16 on the first composite layer 19. In the example of FIG. 3, the reinforcing components 16 are placed in a peripheral rim 27 and transition zone 28 of the bulkhead. The transition zone 28 corresponds to the area of the bulkhead between a central area 29 and a peripheral rim 27, and in which the curvature radius of the bulkhead is small (high curvature). This transition zone 28 is submitted to loads during the use of the bulkhead, as this portion transmits loads between the central area 29 of the bulkhead and a peripheral rim 27 of the bulkhead 23 for its attachment to the fuselage, thereby replacing multiple assembly parts.

In a third step, the first robotic device and second robotic device may place composite components, e.g., tape, on the first mold and the second mold the reinforcing components 16 and/or the first composite layer to form the second composite layer 20. The reinforcing components 16 are thereby encapsulated between the first composite layer 19 and the second composite layer 20, such that the bulkhead is integral in a one-piece composite bulkhead.

The second and third step may be repeated to form multiple composite layers with reinforcing elements inserted between the successive composite layers.

The composite part—in this example a bulkhead—may then be cured while on the first or second mold.

The bulkhead 23 comprises a peripheral rim 27 on its outer periphery. This peripheral rim 27 is generally semi-annular or frustoconical in shape. It may also comprise a flat or high-radius convex central area 29 around its symmetry central point. Moreover, a method and device according to an embodiment(s) of the invention allow to manufacture such bulkhead 23 in one-piece with a small radii curvature (high-curvature) transition zone 28 in between the central area 29 and the peripheral rim 27.

Figure 4:
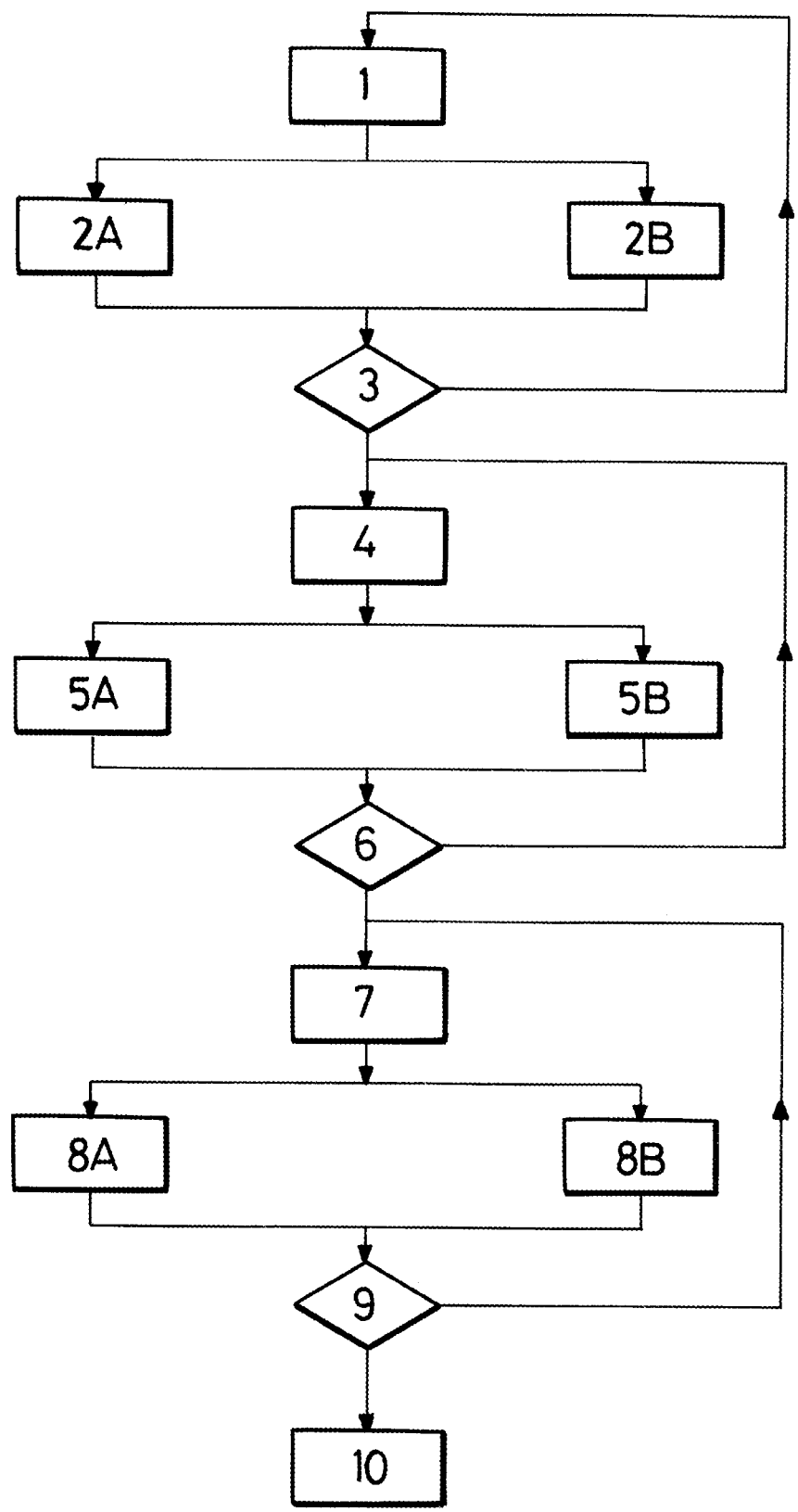
FIG. 4 is a schematic representation of a method according to the invention.

FIG. 4 represents a process of manufacturing according to the invention with some more details.

In step 1, the frame supporting the first mold 11 and the second mold 12 rotates the molds around a symmetry central point 15 to a predetermined position. The frame 13 may include support posts on opposite sides of the molds. A supporting rod or arm (see axis 14) may extend between the posts. The molds are mounted to the rod or arm such that the backsides the molds face each other and the functional surfaces 17, 18 face away from the molds and towards a respective one of the robotic devices, as shown in FIG. 2. The molds may have a center axis 35 that extends through the central point 15 of the mount 15 to the frame.

In steps 2A and 2B, which may be simultaneous, the first robotic device 21 and the second robotic device 22 each place a composite component, such as a pre-impregnated carbon fiber-reinforced plastic (CFRP) tape for example, respectively on the first mold 11 and the second mold 12.

In step 3, the number of composite elements placed on the first mold and the second mold is compared to a predetermined value. As long as a first predetermined number of composite components to be placed is not reached, the steps 1, 2A, 2B, and 3 are repeated.

This first phase comprising multiple iterations of steps 1, 2A, 2B, and 3 may allow to create a first composite layer 19 on the first mold 11 and the second mold 12. In this first phase, the first mold 11 and the second mold 12 may be rotated to a new position at each new iteration of the step 1, if necessary.

Once the first predetermined number of composite components is placed on the first mold 11 and the second mold 12, the process proceeds with a second phase comprising steps 4, 5A, 5B and 6.

In a step 4, the frame supporting the first mold 11 and the second mold 12 rotates around a symmetry central point 15 to a predetermined position. This position is to allow the first robotic device 21 and the second robotic device 22 or an operator to place a reinforcing component 16 on the composite layer 19.

In steps 5A and 5B, which may or may not be simultaneous, a reinforcing component 16 is placed on the first mold 11 and the same reinforcing components 16 is placed—symmetrically around the symmetry central point 15—on the second mold 12.

In a step 6, the number of reinforcing components 16 placed on the first mold 11 and the second mold 12 is compared to a predetermined value. As long as a predetermined number of reinforcing components 16 to be placed is not reached, the steps 4, 5A, 5B and 6 are repeated.

This second phase comprising multiple iterations of steps 4, 5A, 5B and 6 may allow to place multiple reinforcing components 16 on the first composite layer 19 so as to form a composite assembly. In this second phase, the first mold 11 and the second mold 12 may be rotated to a new position at each new iteration of the step 4, if necessary.

Once the predetermined number of reinforcing components is placed on the first mold 11 and the second mold 12, the process proceeds with a third phase comprising steps 7, 8A, 8B and 9 similar to steps 1, 2a, 2B and 3.

In step 7, the frame supporting the first mold 11 and the second mold 12 rotates around a symmetry central point to a predetermined position.

In steps 8A and 8B, which may beneficially be simultaneous, the first robotic device 21 and the second robotic device 22 each place a composite component, such as a pre-impregnated CFRP tape for example, respectively on the first mold 11 and the second mold 12.

In step 9, the number of composite elements placed on the first mold and the second mold is compared to a predetermined value. As long as a second predetermined number of composite components to be placed is not reached, the steps 7, 8A, 8B and 9 are repeated.

This third phase comprising multiple iterations of steps 7, 8A, 8B and 9 may allow to create a second composite layer 20 on the reinforcing components 16 and the first composite layer 19. In this third phase, the first mold 11 and the second mold 12 may be rotated to a new position at each new iteration of the step 7, if necessary.

Once the second predetermined number of composite components is placed on the composite assembly, the process proceeds with step 10.

In a further step 10, the composite assembly may be cured in order to provide mechanical cohesion to the composite assembly.

Figure 5A:
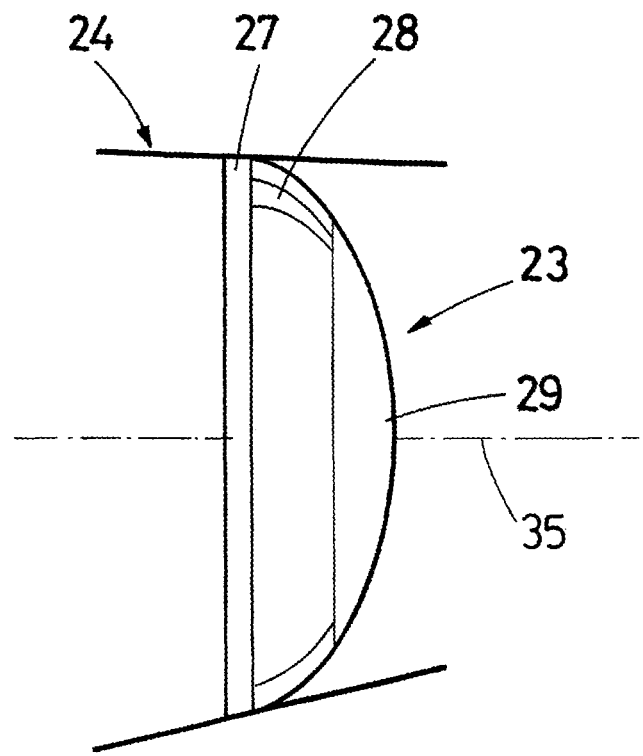
FIG. 5a is a schematic representation of a cross-section view of a one-piece bulkhead that may be obtained with a method of the invention.
Figure 5B:
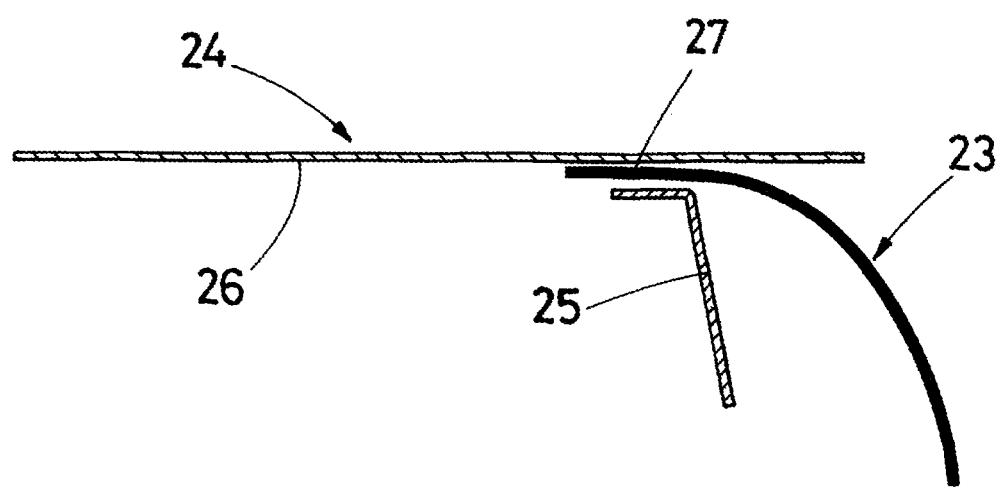
FIG. 5b is a schematic representation of a cross-section view of a detail of an attachment of a bulkhead of FIG. 5a to an aircraft fuselage.

The FIGS. 5a and 5b are representations for the understanding of the benefits obtained by a manufacturing method and device according to the invention to manufacture a one-piece bulkhead for an aircraft.

In FIG. 5a, a bulkhead 23 that may obtained by a method as described in relation with FIG. 4, for example by implementing said method on a device of FIGS. 1 and 2, with the components of FIG. 3, is schematically represented in side-view, mounted in an aircraft's fuselage 24 in their final assembly position. Due to the manufacturing of such bulkhead 23 on a single mold, with small radii between its peripheral rim and its center, that can be reached and assembled as one-piece by rotating the molds 11, 12 around a symmetry central point 15, and due to the use of robotic arms, the bulkhead 23 may be assembled directly to the aircraft's fuselage 24 without or with a very limited number of intermediate parts. This invention thereby provides significant gains in manufacturing duration and complexity, as well as more interior space of an aircraft cabin (on the pressurized side of the bulkhead 23 which is on its concave side).

FIG. 5b is a detail view of how the one-piece bulkhead 23 may be attached by its peripheral rim 27 to the frame 25 and skin 26 of the fuselage 24. The loads applied to the central area of the bulkhead by the pressure difference between its concave side and convex side are transmitted through the transition zone 28 to it peripheral rim 27 and thereby to the fuselage frame 25.

Figure 6A:
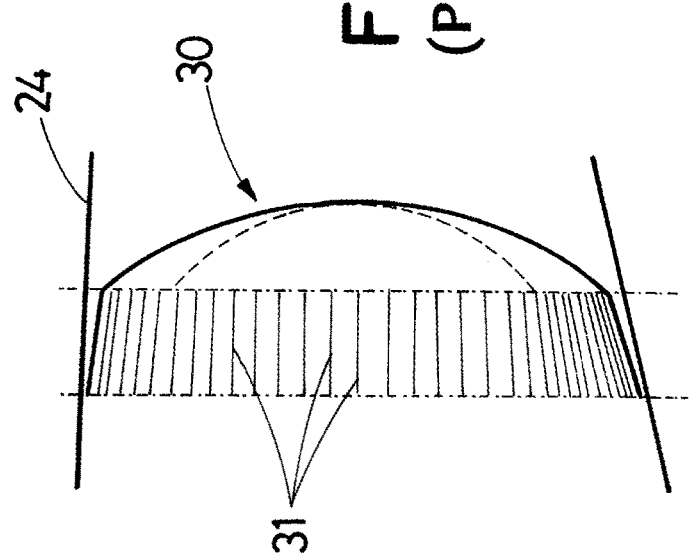
FIG. 6a is a schematic representation of a cross-section view of a bulkhead of the prior art.
Figure 6B:
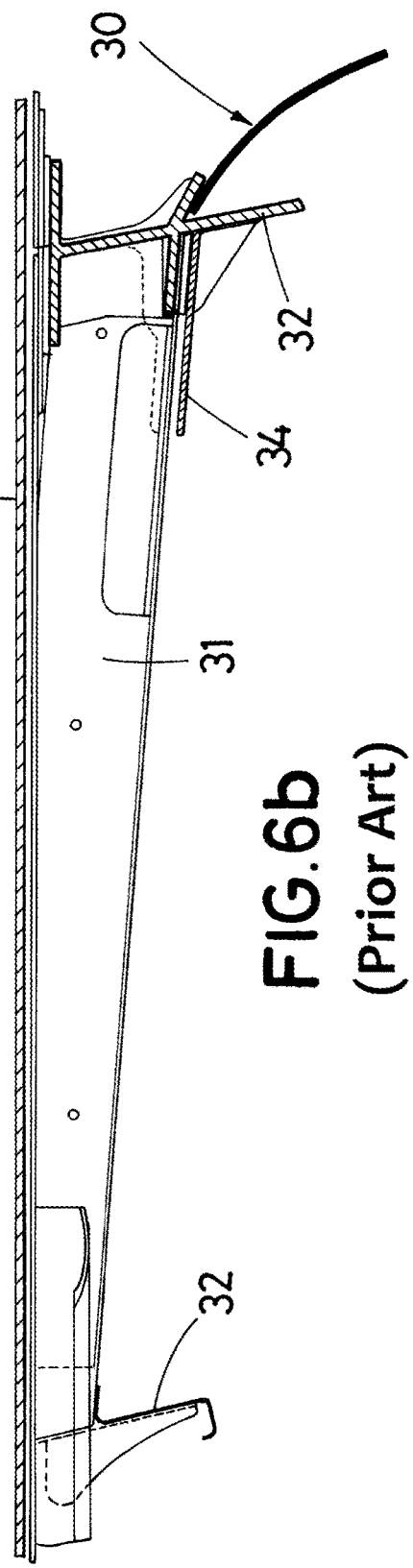
FIG. 6b is a schematic representation of a cross-section view of a detail of an attachment of a bulkhead of the prior art according to FIG. 6a to an aircraft fuselage.

FIGS. 6a and 6b are a representation of a bulkhead of the prior art, here represented to offer a comparison standpoint with a one-piece bulkhead.

In FIG. 6a the bulkhead 30 is schematically represented in side-view, mounted in an aircraft's fuselage 24. The bulkheads 30 of the prior art only comprise a high radii curvature (small curvature) portion. This bulkhead 30 is attached to the fuselage through long gussets 31, distributed discretely around the fuselage 24. These gussets serve as a transition between the high radii bulkhead 30 and the conical fuselage 24. The installation of such gussets is long and complex. Moreover there weight is much higher than the peripheral rim 27 and transition zone 28 of the bulkhead presented in FIGS. 3, 5a and 5b.

FIG. 6b is a detail view of how the prior-art bulkhead 30 may be attached through the gussets 31 to the frame 32 and skin 33 of the fuselage 24. The frame 32 has a bigger size and project more inwardly in the fuselage compared to the frame 25 of FIG. 5b. Also, an additional part known as a tie 34 may be needed to join the gussets 31 to the frame 32. The loads of such bulkhead 30 are therefore transmitted to the fuselage 24 through the multiple gussets 31.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise.

The invention claimed is:

1. A device configured to manufacture a composite part, the device comprising:
    a frame;
    a first mold configured to form a first bulkhead in a fuselage of an aircraft, wherein said first mold is mounted on the frame and pivots about a rotational axis of the frame, said first mold includes a first functional surface adapted to receive a first component of a first composite part,
    a first robotic device including a first fixed extremity fixed at a first fixed position fixed relative to the frame and a first functional extremity configured to place the first component of the first composite part on the first mold, and to apply first sections of composite tape to the first functional surface of the first mold,
    a second mold configured to form a second bulkhead for the fuselage of the aircraft, wherein said second mold is mounted on the frame and pivots about the rotational axis of the frame, said second mold includes a second functional surface adapted to receive a second component of a second composite part, the second functional surface of the second mold has a shape substantially identical as a shape of the first functional surface of the first mold, wherein the second mold is arranged in a central symmetric position around a symmetry central point with regard to the first mold, and
    a second robotic device including a second fixed extremity fixed at a second fixed position fixed relative to the frame and a second functional extremity configured to place the second component of the second composite part on the second mold and apply second sections of composite tape to the second functional surface of the second mold while the first functional extremity applies the first composite tape sections to the first functional surface,
    wherein a gap between the first mold and the second mold separates the first mold and the second mold, and the rotational axis of the frame extends through and is parallel to the gap.

2. The device according to claim 1, wherein the first robotic device and the second robotic device are adapted to perform operations simultaneously with central symmetry relationship around the symmetry central point.

3. The device according to claim 1, wherein the first robotic device and the second robotic device are each adapted to move relate to the frame.

4. The device according to claim 1, wherein the first robotic device and the second robotic device each include a composite tape laying device.

5. The device according to claim 1, wherein the first robotic device and the second robotic device each include a robotic arm.

6. The device according to claim 1, wherein the first function surface has a convex shape mold and the second functional surface has a convex shape.

7. The device according to claim 1, wherein the first mold and the second mold are each configured to form at least one bulkhead configured for placement in an aircraft fuselage.

8. The device according to claim 1, wherein:
    the first functional surface of the first mold includes a first central portion having a convex shape and a first circumferential portion extending around the central portion, wherein a radius of curvature of the first central is shorter than a radius of curvature of the first circumferential portion, and
    the frame and the first robotic device are adapted to lay composite tapes circumferentially on the first circumferential portion of the first functional surface.

9. The device according to claim 1, wherein the first robotic device and the second robotic device are each adapted to lay composite tapes having a width in a range of 0.7 to 7 centimeters.

10. The device according to claim 1, wherein the first robotic device and the second robotic device are each adapted to:
    lay the first and second sections of the composite tapes respectively on the first mold and the second mold,
    apply at least one reinforcing component on the first and section sections of the composite tapes laid respectively on the first mold and second mold, and
    lay additional sections of the composite tapes at least partially over said at least one reinforcing component respectively on the first mold and second mold.

11. A method to manufacture bulkheads for a fuselage of an aircraft, the method comprising:
    forming a first bulkhead by using a first robotic device to apply first sections of composite tape to a first functional surface of a first mold, wherein the first mold is mounted to a frame having a rotational axis about which the first mold pivots and the first functional surface faces in a first direction perpendicular to the rotational axis; and
    forming a second bulkhead by using a second robotic device to apply second sections of composite tape to a second functional surface of a second mold, wherein the second mold is mounted to the frame, the second mold pivots about the rotational axis, and the second functional surface faces in a second direction away from the first direction and perpendicular to the rotational axis,
    wherein the first robotic device includes a first fixed extremity fixed at a first fixed position fixed relative to the frame and a first functional extremity which applies the first sections of the composite tape to the first functional surface of the first mold;
    wherein the second robotic device includes a second fixed extremity fixed at a second fixed position fixed relative to the frame and a second functional extremity applying the second sections of the composite tape to the second functional surface of the second mold while the first functional extremity applies the sections of the composite tape to the first functional surface, and
    wherein a gap between the first mold and the second mold separates the first mold and the second mold, and the rotational axis of the frame extends through and is parallel to the gap.

12. The method according to claim 11, wherein a first component is placed by the first robotic device on the first mold, while a second component is placed by the second robotic device on the second mold.

13. The method according to claim 12, wherein the first component is at least a portion of the first bulkhead for the aircraft fuselage and the second component is at least a portion of a second bulkhead for the fuselage for the aircraft.

14. The method of claim 11, wherein the steps of forming the first bulkhead and the second bulkhead are preformed simultaneously.

15. The method of claim 11, wherein the step of forming the first bulkhead includes the first functional extremity of the first robotic device moving relative to the frame while the first mold pivots about the rotational axis.

16. The method of claim 11, wherein the first functional extremity of the first robotic device and the second functional extremity of the second robotic devices move simultaneously and symmetrically with respect to a central point at an intersection of the rotational axis and the first direction during the applications of the first and second sections of composite tapes to the first and second functional surfaces respectively.

17. The method of claim 11, wherein the first mold and second mold pivot about the rotational axis while the first functional extremity of the first robotic device and the second functional extremity of the second robotic devices apply the first and second sections of composite tape.

18. The method of claim 11, wherein the first robotic device is the only robotic device applying the sections of the composite tape to the first functional surface of the first mold, and the second robotic device is the only robotic device applying the first and second sections of composite tape to the second functional surface of the second mold respectively.

19. A method to manufacture bulkheads for a fuselage of an aircraft, the method comprising:
  forming a first bulkhead by using a first robotic device to apply first sections of composite tape to a first functional surface of a first mold, wherein the first mold is mounted to a frame having a first rotational axis about which the first mold rotates and the first functional surface is symmetrical about a second axis perpendicular to the first rotational axis; and
  forming a second bulkhead by using a second robotic device to apply second sections of composite tape to a second functional surface of a second mold, wherein the second mold is mounted to the frame, the second mold rotates about the first rotational axis, and the second functional surface is symmetrical about the second axis,
  wherein the first robotic device includes a first fixed extremity fixed at a first fixed position fixed relative to the frame and a first functional extremity which applies the first sections of composite tape to the first functional surface of the first mold;
  wherein the second robotic device includes a second fixed extremity fixed at a second fixed position fixed relative to the frame and a second functional extremity which applies the second sections of the composite tape to the second functional surface of the second mold while the first functional extremity applies the sections of the composite tape to the first functional surface, and
  wherein a gap between the first mold and the second mold separates the first mold and the second mold, and the rotational axis of the frame extends through and is parallel to the gap.

20. The method of claim 19, further comprising:
  rotating simultaneously the first mold and the second mold to position the first functional surface in alignment with the second robotic device and the second functional surface in alignment with the first robotic device, and
  applying third sections of composite tape by the second robotic device to the first functional surface or to the first sections of composite tape previously applied to the first functional surface, and
  applying fourth sections of composite tape by the first robotic device to the second functional surface or to the second sections of composite tape previously applied to the second functional surface.

21. The method of claim 19, wherein the first functional extremity of the first robotic device and the second functional extremity of the second robotic devices move simultaneously and symmetrically about a central point at an intersection of the rotational axis and the second axis during the applications of the first and second sections of composite tapes to the first and second functional surfaces respectively.

22. The method of claim 19, wherein the first mold and second mold pivot about the rotational axis while the first and second robotic devices apply the first and second sections of composite tape.

23. The method of claim 19, wherein the first robotic device is the only robotic device applying the sections of the composite tape to the first functional surface of the first mold, and the second robotic device is the only robotic device applying the first and second sections of composite tape to the second functional surface of the second mold respectively.

* * * * *